J. T. SMITH.
DERAILMENT BRAKE.
APPLICATION FILED JAN. 27, 1920.
1,353,794.
Patented Sept. 21, 1920.
2 SHEETS—SHEET 2.
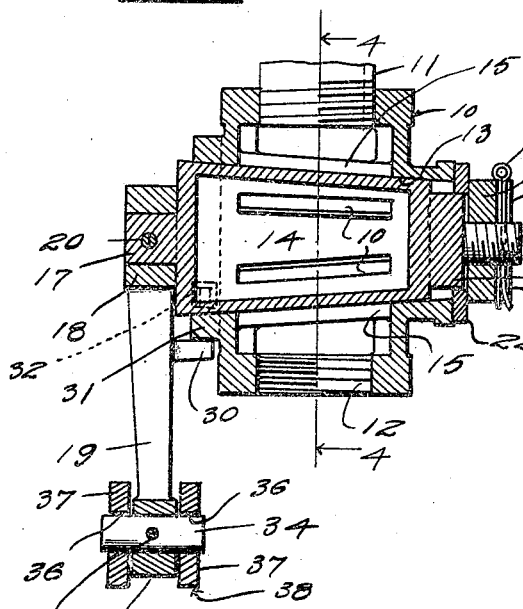
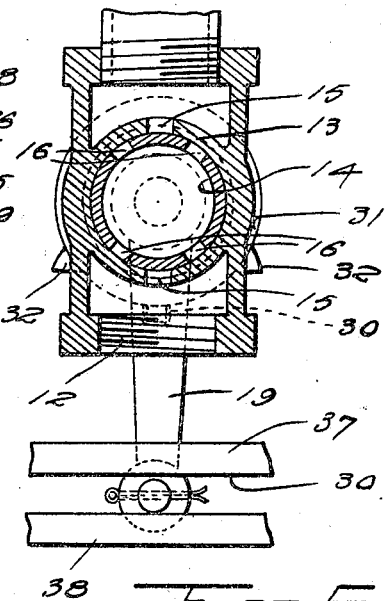
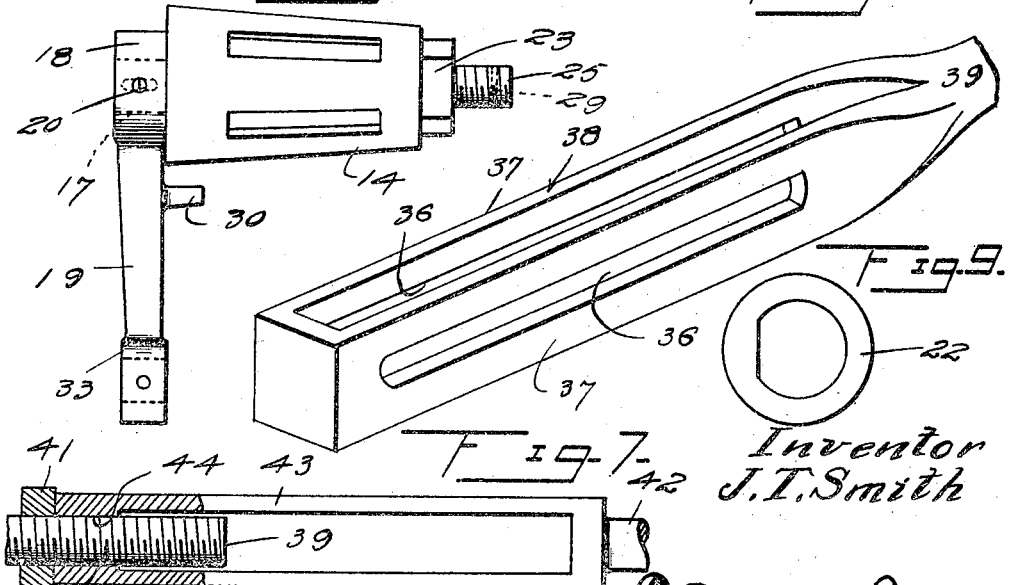
Inventor
J. T. Smith
By [signature], Atty

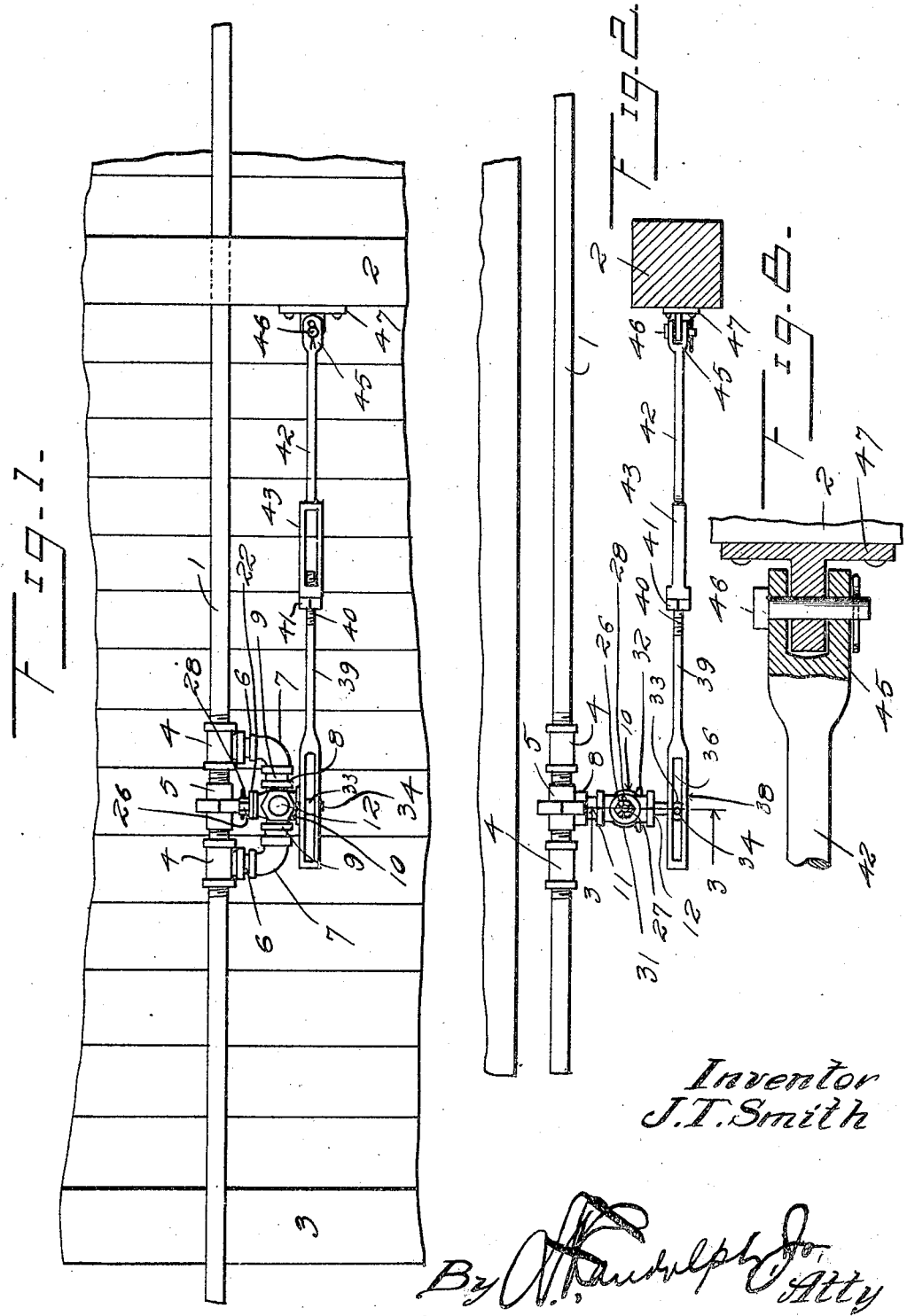

UNITED STATES PATENT OFFICE.

JAMES T. SMITH, OF TACOMA, WASHINGTON.

DERAILMENT-BRAKE.

1,353,794.   Specification of Letters Patent.   Patented Sept. 21, 1920.

Application filed January 27, 1920. Serial No. 354,473.

*To all whom it may concern:*

Be it known that I, JAMES T. SMITH, a citizen of the United States, residing at Tacoma, in the county of Pierce and State of Washington, have invented certain new and useful Improvements in Derailment-Brakes; and I do hereby declare the following to be a full, clear, and exact description of the invention, such as will enable others skilled in the art to which it appertains to make and use the same.

This invention relates to certain new and useful improvements in safety air brake appliance for steam, traction or other railways; the object being to provide a device for each car which will automatically and instantly apply the ordinary air brakes with which most cars are now equipped, to the whole train the moment a single truck, for any cause leaves the rails.

Another object of the invention resides in the provision of a simple and inexpensive arrangement of valve mechanism which will be efficient in operation and by which the brakes are only automatically applied in case the truck leaves the track and which are then operated by substantially the same means as when under manual control; which is by allowing air to escape from the train line, thus reducing the pressure in the air cylinders connected with the brake mechanism.

A further object of the invention resides in the provision of a safety air brake appliance of the character above stated which will not interfere with the usual means under the control of the train men to operate the brakes independently under normal conditions.

A further object of the invention resides in the provision of a safety air brake appliance of the above stated character which may be applied to various types of trucks either when building the cars or after the cars have been completed.

A still further object of the invention resides in the provision of a safety air brake appliance which will be of such form that the parts thereof cannot be engaged by the wheels of the truck and the operation of the device thereby interfered with.

This invention has for a further object the provision of a safety air brake appliance which will be connected with the train line about midway between the end sill and the truck bolster and all of the parts positioned adjacent the train line and near the longitudinal center of the car and the parts constructed and arranged in such a manner that the valve of the mechanism will be opened to cause an instantaneous and automatic application of the emergency air brake when the valve is operated in either direction.

With the foregoing and other objects in view as will appear as the description proceeds, the invention consists in the novel construction, combination and arrangement of coöperating elements as hereinafter more specifically set forth, claimed and illustrated in the accompanying drawings in which:

Figure 1 is a bottom plan view showing the application of the invention to a railway car of conventional form, Fig. 2 is a side elevation of the part shown in Fig. 1, Fig. 3 is an enlarged detail section on the plane of line 3—3 of Fig. 2, Fig. 4 is an enlarged detail section at right angles to Fig. 3, taken on the plane of line 4—4 of Fig. 3.

Fig. 5 is a detail of the valve and valve stem removed,

Fig. 6 is a detail view of the valve operating slide rod,

Fig. 7 is a detail view of the adjusting rod,

Fig. 8 is a detail view showing one manner of mounting the adjusting rod upon the truck bolster.

Fig. 9 is an enlarged detail view of the washer mounted on the reduced extension of the cylindrical valve to bear against the small end of the valve casing.

Referring more in detail to the drawings in which similar reference characters designate corresponding parts throughout the several views, 1 indicates the air line, 2 the truck bolster and 3 the end sill of a railway car through which this appliance is attached.

When incorporating this safety air brake appliance in the car structure, the air line 1 is opened about midway between the truck bolster 2 and the end sill 3 and a pair of T connections 4 threaded on the air line 1 and connected by a nipple 5 or other suitable connection so that the fluid may pass through the air line 1. Short pipe sections or connections 6 are threaded in the T connections 4 and have L connections 7 threaded thereon and turned toward one another for connection with another T 8 by the short connecting pipe sections 9. The exhaust valve chamber 10 is suspended from the T 8 by the short threaded pipe section or nipple 11.

The lower end 12 of the exhaust valve chamber is open and the exhaust valve chamber is normally closed by the longitudinally tapered cylindrical valve 14 which is also hollow and adapted for limited rotation in either direction within the longitudinally tapered cylindrical valve chamber 13, which is extended transversely in the exhaust valve casing 10. The opposite ends of the valve chamber are open and the valve 14 extends through the open ends of the valve chamber 13, the purpose of which will presently appear. Within the upper and lower walls are provided the elongated tapering ports 15 and similar ports 16 are provided in the body of the valve 14 and arranged in diametrically opposite pairs for registration at times, with the ports 15, the purpose of which will also presently appear. The valve 14 is provided centrally upon its large end with a square lug or head 17, over which is engaged a correspondingly apertured end 18 of the depending valve arm 19, a locking pin 20 being extended through the end 18 of the valve arm 19 and through the lug or head 17 to securely fasten this end of the valve arm 19 and eliminate danger of binding of these parts during operation of the appliance. The lower end of the valve portion is provided with a reduced extension 21 to receive a washer 22 engaged thereon and bearing against the lower end of the valve chamber 13. The extension 21 is provided with a straight side produced by cutting away a portion of the extension 21, as shown at 23 and the washer 22 has a shoulder 24 formed therein for engagement with this portion of the extension 21 to prevent rotation of the washer 22 upon the valve extension 21. The small end of the valve 14 is provided with a central threaded shank 25 to receive the nut 26 which may be threaded home till in close engagement with the washer 22 and the valve extension 21 to securely hold the valve 14 against longitudinal movement within the valve chamber 13. While the nut 26 may be of any conventional form, I prefer to employ a nut having a plurality of radially extending slots 27 in its outer face to accommodate the locking pin 28 to be engaged therein and extended through a transverse key slot or trough 29 extended through the outer end of the threaded shank 25, thereby securely locking the nut 26 in adjusted position and preventing the nut from working off of the shank 25. In order that the valve 14 may have only limited rotation within the valve chamber 13, I have provided a stop lug 30 projecting from the side of the valve arm 19 and adapted to ride upon the outwardly directed flange 31 around the large open end of the valve chamber 13, movement of the stop lug 30 being limited in either direction by the shoulders 32 of the flange 31. When the stop lug 30 is between the shoulders 32, the valve 14 is in closed position within the valve chamber 13, solid portions of the valve body being located opposite the ports 15 of the valve chamber. When the valve arm 19 is moved in either direction from its vertical depending position, however, into engagement with one of the shoulders 32, the valve 14 is thereby rotated sufficiently to bring two of the diametrically opposite ports 16 thereof into position opposite the ports 15 of the valve chamber 13, permitting the air or other fluid to escape from the train line 1 and thereby cause automatic application of the emergency brake, as will be clearly understood by those familiar with this art.

Extended transversely through the lower enlarged end 33 of the valve arm 19, is a bolt or pin 34 which is secured in position by a locking pin 35 extended through said end 33 at a right angle to the bolt or pin 34 and also through the latter. The opposite ends of the bolt or pin 34 are extended a sufficient distance to project through elongated slots 36 in the opposite parallel sides 37 of the bifurcated end 38 of the slide rod 39 which operates the valve 14. The opposite end of the slide rod 39 is threaded, as shown at 40 and a stop nut 41 threaded thereon to proper position to indicate the position to which the adjusting rod 42 should be threaded upon the slide rod 39. The adjusting rod 42 also has a bifurcated end 43, the outer extremity of which is formed into an interiorly threaded socket 44 to receive the threaded end 40 of the slide rod 39. The opposite end of the adjusting rod 42 is forked, as shown at 45, and a pivot pin 46 is extended through the forked or separated portions of this end and through a perforated horizontal ear 47 of a bracket 48 of suitable construction and which is mounted upon the truck bolster 3. The bracket 48 must be of such construction and mounted upon the truck bolster 3 as to permit free horizontal swinging movement of the connecting rod 42 and the slide rod 39 as the car rounds a curve. A locking pin 49 is preferably secured through the free or lower end of the pivot pin 46 to prevent this pin from working out of position. While the locking pins described and illustrated are preferably in the form of cotter pins any suitable locking members may be substituted therefor.

It will be understood that all of the operative parts of this appliance must be connected and mounted in such a manner as to eliminate all danger of binding of one part upon another, thereby interfering with the efficient operation of the appliance.

When the appliance is placed upon the car, the adjusting rod 42 should be threaded to position against the nut 41 on the slide rod 39, this nut 41 being previously adjusted so that when the parts are brought together in proper relation, the pin 34 of the valve arm 19 will be located centrally in the slots 36 of the slide rod 39, thereby giving the slide rod 39 a movement sufficient to allow for the turning of the truck in either direction as the car is rounding a curve, without operation of this appliance. Should the wheels of the truck leave the rails, however, the slide rod 39 will be moved sufficiently to rotate the valve 14 in one direction within the valve chamber 13 and thereby open the valve and permit escape of the fluid from the air line 1. It will be seen that the slide rod 39 and adjusting rod 42 are so connected and mounted that operation of this appliance will be automatic immediately upon the wheels of the truck leaving the rails for any cause whatsoever. It will also be evident that this appliance may be adjusted to the many different forms of car trucks and mounted adjacent to the air line 1 of the car and in such a position as not to be interfered with by the wheels of the truck or by the ties of the track over which the car is moving, furthermore, this appliance will not interfere with the manual control of the air brakes or other mechanism of the car when the same is running under normal conditions.

While the preferred embodiment of the invention has been shown and described, it is to be understood that minor changes in the details of construction and arrangement of parts may be resorted to in the application of the invention, within the scope of the appended claims without departing from the spirit of the invention.

What is claimed is:—

1. A safety air brake appliance for a car comprising an auxiliary air valve located in an offset portion of the air line of the car, said auxiliary air valve serving as an exhaust valve and being normally closed, a slide rod connected with said valve and adapted to operate the latter and to move a predetermined distance in either direction, and an adjusting rod connected with said slide rod and pivoted for horizontal movement upon the car truck bolster.

2. A safety air brake appliance for a car comprising an auxiliary air valve in an offset portion of the air line of the car, said auxiliary air valve serving as an exhaust valve and being normally closed, means connected with said air valve to operate the latter and to move a predetermined distance in either direction, and adjusting means connected with the last mentioned means and pivoted for horizontal movement upon the car truck bolster.

In testimony whereof I affix my signature in presence of two witnesses.

JAMES T. SMITH.

Witnesses:
E. R. FLETCHER,
C. E. LANE.